3,510,325
OPTICAL CROWN GLASS
Heinz Broemer, Hermannstein, Kreis Wetzlar, and Norbert Meinert, Wetzlar (Lahn), Germany, assignors to Fa. Ernst Leitz G.m.b.H., Wetzlar, Germany
Filed Aug. 10, 1965, Ser. No. 478,607
Claims priority, application Germany, Sept. 23, 1964,
L 48,849
Int. Cl. C03c 3/08, 3/14
U.S. Cl. 106—54                                4 Claims

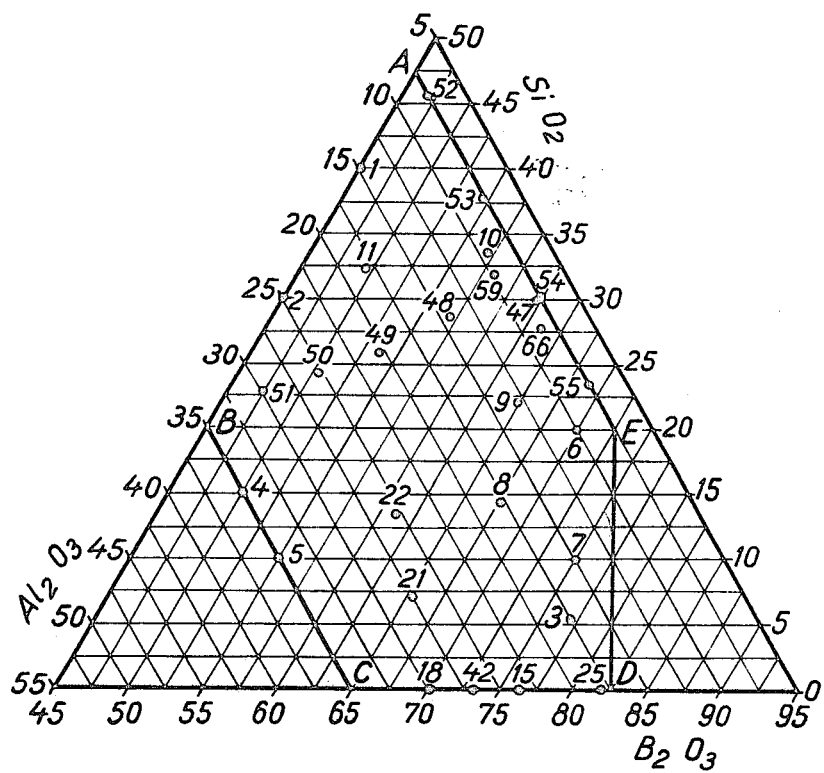

ABSTRACT OF THE DISCLOSURE

An optical crown glass may be produced by melting a mixture consisting essentially of 50 to 85% by weight of $B_2O_3$, $SiO_2$ and $Al_2O_3$, 9 to 40 weight percent of bivalent oxides and other metal oxides. The following mixture is illustrative: $B_2O_3$ amounting to 42–46%, $SiO_2$ at 0–3 weight percent, $Al_2O_3$ at 9–16.5 weight percent, the total concentration of these oxides in the mixture being from 55 to 62 weight percent; CaO at 20–25 weight percent, BaO at 0–3 weight percent, ZnO and/or CdO at 0–10 weight percent, the total concentration of bivalent oxides being from 23 to 35 weight percent; and $La_2O_3$ at 14–16 weight percent, $ZrO_2$ at 0–10 weight percent, and $Ta_2O_5$ at 0–5 weight percent.

---

This invention relates to improved optical crown glasses manufactured from novel starting mixtures.

DESCRIPTION OF THE PRIOR ART

Mass production of high-quality optical systems is currently required to meet present day requirements. As a result, the requirements and standards which must be met by optical glass have greatly increased. Of particular significance in this respect are the glasses employed in continuous melting processes and the chemical stability thereof. Other standards which the glass must meet include the preservation of the optical position, clarity and absence of color, and the moldability of the glasses. However, in previous known optical crown glasses having indices of refraction $n_e$ of approximately from 1.55 to 1.65 and dispersion values $v_e$ of approximately from 55 to 62, all of these requirements have not been met.

SUMMARY OF THE INVENTION

It is the object of this invention to provide optical crown glasses and mixtures from which they can be formed which have the requisite characteristics for use in continuous melting processes, and which have superior chemical stability and resistance, retention of optical position, clarity and absence of color, and molding characteristics.

Starting mixtures for the manufacture of optical crown glasses have now been found which may be melted without difficulties in the continuous process and which moreover meet all the requirements enumerated hereinabove. They are, therefore, of considerable technical significance.

BRIEF DESCRIPTION OF THE DRAWING

The three component diagram illustrates the relative proportions of boric acid, silicic acid and aluminum oxide employed in the composition. The starting mixtures of the crown glasses according to the present invention consist—in an amount from 50 to 85 percent by weight—of boric acid, silicic acid and aluminum oxide. The relative proportions of these constituents, as parts per 100 parts of the total of the three, are within the three-component diagram in a range which is delimited by the following points:

|           | A    | B  | C  | D    | E    |
|-----------|------|----|----|------|------|
| $B_2O_3$  | 45   | 45 | 65 | 82.5 | 72.5 |
| $SiO_2$   | 47.5 | 20 |    |      | 20   |
| $Al_2O_3$ | 7.5  | 35 | 35 | 17.5 | 7.5  |

DESCRIPTION OF THE PREFERRED EMBODIMENTS

The starting mixtures contain, moreover, a total of from 9 to 40 percent by weight of the oxides of the bivalent elements calcium, strontium, barium and zinc or cadmium. They should contain specifically:

|                            | Percent by weight |
|----------------------------|-------------------|
| Calcium oxide (at least)   | 9–37              |
| Strontium oxide            | 0–10              |
| Barium oxide               | 0–7               |
| Zinc oxide                 | 0–9               |

For the purpose of adjusting specific optical values, these glasses furthermore can contain:

|                 | Percent by weight |
|-----------------|-------------------|
| Lanthanum oxide | 0–16              |
| Zirconium oxide | 0–9               |
| Tantalum oxide  | 0–4               | as well as, among the oxides of monovalent metals, up to 5 percent by weight of each of lithium oxide and/or sodium oxide.

Optical crown glasses with an index of refraction $n_e = 1.645$ and an abbe or dispersion value $v_e = 58$, which have been employed in a large number of lens calculations having been carried out in actual practice, may be melted particularly from glass mixtures which consist of:

|           | Percent by weight |
|-----------|-------------------|
| $B_2O_3$  | 42–46             |
| $SiO_2$   | 0–3               |
| $Al_2O_3$ | 9–16.5            |

The sum total of these oxides is 55–62 percent by weight.

|                | Percent by weight |
|----------------|-------------------|
| CaO            | 20–25             |
| BaO            | 0–3               |
| ZiO and/or CdO | 0–10              |

The sum total of these oxides is 23–35 percent by weight.

|           | Percent by weight |
|-----------|-------------------|
| $La_2O_3$ | 14–16             |
| $ZrO_2$   | 0–10              |
| $Ta_2O_5$ | 0–5               |

An example for carrying out the melt of such glass is set forth hereinbelow.

EXAMPLE 1

The ingredients in the concentrations set forth in Melt No. 3 in Table 2 below and having a total weight of approximately 3 kilograms were well mixed and placed in the respective portions into a platinum crucible having a temperature of approximately 1200 to 1250° C. and were melted down. The temperature was thereafter raised to 1300° C., and the melt was purified for approximately 60 minutes with continued stirring. Thereupon, and while still constantly stirring, the temperature was reduced to 1050° C. within about 15 minutes. Without further stirring, the melt was allowed to cool to 900° C. The melt was poured at that temperature into steel molds which had ben preheated to 600° C.

The transformation point of the glass was at 583° C., the softening point thereof was at 632° C. The expansion coefficient was $6.15 \times 10^{-6}$ within the temperature range of from 100 to 150° C. The optical values were $n_e = 1.6451$ and $v_e = 57.8$ The extremely low portion of barium oxide and the relatively high portion of aluminum oxide contributed substantially to the chemical stability of these glasses. The latter also exhibited superior molding strength characteristics because of the $Al_2O_3$ constituent.

One of the most frequently employed optical crown glasses with the optical values $n_e=1.62$ and $v_e=60.0$ can be melted from starting mixtures which consist of

|  | Percent by weight |
|---|---|
| $B_2O_3$ | 34–44 |
| $SiO_2$ | 13–21 |
| $Al_2O_3$ | 5–10 |

The sum total of these portions should amount to between 55 and 75 percent by weight.

The starting mixtures further contain

|  | Percent by weight |
|---|---|
| Calcium oxide | 25–37 |
| Barium oxide | 0–5 |

The sum total of the bivalent oxides should be between 25 and 40 percent by weight. Lanthanum oxide may be present in these batches in an amount of up to 5 percent by weight and lithium oxide up to 3 percent by weight. The high portion of vitrifiers and of aluminum oxide makes these glasses well readily moldable. Because of the extremely low barium oxide constituent, they are also very stable chemically.

An example for carrying out the melt of such a glass will be given hereinafter.

approximately 3 kilograms, were well mixed and placed in portions into a platinum crucible at a temperature of approximately 1300° C. and were melted down. The temperature was thereafter raised to 1400° C., and the melt was purified for approximately 60 minutes with continued stirring. Thereupon, and with continued stirring, the temperature was reduced to 1200° C. within about 15 minutes. Without further stirring, the melt was allowed to cool to 950° C. Pouring-off took place at that temperature into steel molds which had been preheated to 600° C.

The transformation point of the glass was at 587° C., and the softening point thereof was at 642° C. The expansion coefficient was $6.6 \times 10^{-6}$ within the temperature range of from 100 to 150° C. The optical values were $n_e=1.6228$ and $v_e=60.06$.

In the tables which are being set forth hereinbelow, detailed and specific starting mixtures for glasses according to the present invention are indicated. Table 1 shows starting mixtures whose relative proportions of boric acid, silicic acid and aluminium oxide are within the boundaries of the afore-mentioned range within the three-component diagram. The optical values of these glasses, which are obviously influenced by the portion of the other afore-mentioned oxides of the bi-, tri- and tetra-valent elements, are between 1.55 and 1.65 for the index of refraction $n_e$ and between 55 and 61 for the abbe or dispersion value $v_e$.

TABLE 1.—IN PERCENT OF WEIGHT PER 100%

| Melt No. | $B_2O_3$ | $SiO_2$ | $Al_2O_3$ | Σ1 | $B_2O_3$ | $SiO_2$ | $Al_2O_3$ | CaO | BaO | ZnO | Σ2 | $La_2O_3$ | $ZrO_2$ | $n_e$ | $v_e$ |
|---|---|---|---|---|---|---|---|---|---|---|---|---|---|---|---|
| 1 | 27.0 | 24.0 | 9.0 | 60.0 | 45.0 | 40.0 | 15.0 | 23.0 | 4.0 | 2.0 | 29.0 | 11.0 | | 1.6215 | 57.9 |
| 2 | 25.7 | 17.1 | 14.3 | 57.1 | 45.0 | 30.0 | 25.0 | 23.1 | 2.5 | 2.3 | 27.9 | 15.0 | | 1.6424 | 55.1 |
| 51 | 40.0 | 19.3 | 25.0 | 84.3 | 47.5 | 22.8 | 29.7 | 10.9 | | | 10.9 | 4.8 | | 1.5496 | 60.0 |
| 4 | 27.5 | 8.2 | 19.3 | 55.0 | 50.0 | 15.0 | 35.0 | 23.0 | 3.5 | 3.5 | 30.0 | 15.0 | | 1.6425 | 55.2 |
| 5 | 30.2 | 5.5 | 19.3 | 55.0 | 55.0 | 10.0 | 35.0 | 23.0 | 3.5 | 3.5 | 30.0 | 15.0 | | 1.6424 | 57.9 |
| 18 | 45.8 | | 19.1 | 64.9 | 70.1 | | 29.9 | 15.1 | 5.0 | | 20.1 | 15.0 | | 1.6095 | 58.4 |
| 25 | 45.8 | | 10.1 | 55.9 | 82.0 | | 18.0 | 20.1 | | | 20.1 | 15.0 | 9.0 | 1.6533 | 54.7 |
| 7 | 41.2 | 5.5 | 8.3 | 55.0 | 75.0 | 10.0 | 15.0 | 18.0 | 7.0 | 5.0 | 30.0 | 15.0 | | 1.6406 | 57.4 |
| 6 | 38.5 | 11.0 | 5.5 | 55.0 | 70.0 | 20.0 | 10.0 | 18.0 | 7.0 | 5.0 | 30.0 | 15.0 | | 1.6395 | 57.9 |
| 55 | 44.3 | 15.0 | 4.8 | 64.1 | 69.1 | 23.4 | 7.5 | 35.9 | | | 35.9 | | | 1.6152 | 60.5 |
| 54 | 40.0 | 19.3 | 4.8 | 64.1 | 62.4 | 30.1 | 7.5 | 35.9 | | | 35.9 | | | 1.6284 | 59.9 |
| 53 | 35.0 | 24.3 | 4.8 | 64.1 | 54.6 | 37.9 | 7.5 | 35.9 | | | 35.9 | | | 1.6136 | 59.7 |
| 52 | 30.0 | 29.3 | 4.8 | 64.1 | 46.8 | 45.7 | 7.5 | 35.9 | | | 35.9 | | | 1.6117 | 59.7 |

Table 2 indicates starting mixtures which result in the formation of highly refractive glasses similar to the composition of the glass described in Example I.

TABLE 2.—IN PERCENT OF WEIGHT PER 100%

| Melt No. | $B_2O_3$ | $SiO_2$ | $Al_2O_3$ | Σ1 | $B_2O_3$ | $SiO_2$ | $Al_2O_3$ | CaO | BaO | ZnO | CdO | Σ2 | $La_2O_3$ | $ZrO_2$ | $Ta_2O_5$ | $n_e$ | $v_e$ |
|---|---|---|---|---|---|---|---|---|---|---|---|---|---|---|---|---|---|
| 6 | 45.8 | | 16.1 | 61.9 | 74.0 | | 26.0 | 20.1 | | 3.0 | | 23.1 | 15.0 | | | 1.6268 | 58.0 |
| 27 | 45.8 | | 13.1 | 58.9 | 77.7 | | 22.3 | 20.1 | | 6.0 | | 26.1 | 15.0 | | | 1.6327 | 57.3 |
| 28 | 45.8 | | 10.1 | 55.9 | 82.0 | | 18.0 | 20.1 | | 9.0 | | 29.1 | 15.0 | | | 1.6417 | 57.2 |
| 29 | 45.8 | | 10.1 | 55.9 | 82.0 | | 18.0 | 20.1 | | 6.0 | | 29.1 | 15.0 | | | 1.6430 | 57.4 |
| 30 | 43.8 | | 13.1 | 56.9 | 77.0 | | 23.0 | 22.1 | | 6.0 | | 28.1 | 15.0 | | | 1.6409 | 57.0 |
| 31 | 42.8 | | 10.1 | 52.9 | 81.0 | | 19.0 | 23.1 | | 9.0 | | 32.1 | 15.0 | | | 1.5509 | 56.6 |
| 32 | 45.8 | | 10.1 | 55.9 | 82.0 | | 18.0 | 24.1 | | 5.0 | | 29.1 | 15.0 | | | 1.6439 | 57.4 |
| 33 | 45.4 | | 10.0 | 55.4 | 81.9 | | 18.1 | 23.8 | 1.0 | 4.9 | | 29.7 | 14.9 | | | 1.6429 | 57.5 |
| 34 | 45.8 | | 10.1 | 55.9 | 82.0 | | 18.0 | 23.1 | 1.0 | 5.0 | | 29.1 | 15.0 | | | 1.6426 | 57.7 |
| 35 | 45.8 | | 10.1 | 55.9 | 82.9 | | 18.0 | 24.1 | | 6.0 | | 30.1 | 14.0 | | | 1.6426 | 57.4 |
| 36 | 45.8 | | 10.1 | 55.9 | 82.0 | | 18.0 | 23.1 | 1.0 | 6.0 | | 30.1 | 14.0 | | | 1.6419 | 57.3 |
| 37 | 45.8 | | 10.1 | 55.9 | 82.0 | | 18.0 | 23.1 | 2.0 | 4.0 | | 29.1 | 15.0 | | | 1.6457 | 57.7 |
| 38 | 42.8 | 3.0 | 10.1 | 55.9 | 76.6 | 5.4 | 18.0 | 23.1 | 1.0 | 5.0 | | 29.1 | 15.0 | | | 1.6421 | 57.5 |
| 39 | 42.8 | 3.0 | 10.1 | 55.9 | 76.6 | 5.4 | 18.0 | 23.1 | 2.0 | 4.0 | | 29.1 | 15.0 | | | 1.6418 | 57.5 |
| 40 | 42.8 | 3.0 | 10.1 | 55.9 | 76.6 | 5.4 | 18.0 | 23.1 | 2.0 | | | 25.1 | 15.0 | | 4.0 | 1.6509 | 56.7 |
| 41 | 42.8 | 3.0 | 10.1 | 55.9 | 76.6 | 5.4 | 1.80 | 23.1 | 2.0 | | | 25.1 | 15.0 | 4.0 | | 1.6434 | 56.4 |
| 8 | 37.8 | 8.0 | 10.1 | 55.9 | 67.7 | 14.3 | 18.0 | 23.1 | 3.0 | 3.0 | | 29.1 | 15.0 | | | 1.6413 | 57.4 |
| 11 | 27.8 | 18.0 | 10.1 | 55.9 | 49.7 | 32.3 | 18.0 | 23.1 | 3.0 | 3.0 | | 29.1 | 15.0 | | | 1.6409 | 56.7 |
| 3 | 43.6 | 3.0 | 9.9 | 56.5 | 77.2 | 5.3 | 17.5 | 23.0 | 3.0 | | 2.0 | 28.0 | 15.1 | 0.4 | | 1.6451 | 57.8 |

EXAMPLE 2

The ingredients in the concentrations set forth in Melt No. 10 of Table 3 below and having a total weight of Table 3 indicates starting mixtures which result in the formation of crown glasses with values of the glasses specified in the melt—Example 2.

TABLE 3.—IN PERCENT OF EIGHT PER 100%

| Melt No. | $B_2O_3$ | $SiO_2$ | $Al_2O_3$ | Σ1 | $B_2O_3$ | $SiO_2$ | $Al_2O_3$ | CaO | BaO | ZnO | Σ2 | $La_2O_3$ | $Li_2O$ | $n_e$ | $v_e$ |
|---|---|---|---|---|---|---|---|---|---|---|---|---|---|---|---|
| 47 | 40.0 | 19.3 | 5.0 | 64.3 | 62.2 | 30.0 | 7.8 | 30.9 | | | 30.9 | 4.8 | | 1.6153 | 59.7 |
| 48 | 40.0 | 19.3 | 10.0 | 69.3 | 57.8 | 27.8 | 14.4 | 25.9 | | | 25.9 | 4.8 | | 1.5991 | 60.4 |
| 49 | 40.0 | 19.3 | 15.0 | 74.3 | 53.8 | 26.0 | 20.2 | 20.9 | | | 20.9 | 4.8 | | 1.5833 | 60.2 |
| 50 | 40.0 | 19.3 | 20.0 | 79.3 | 50.4 | 24.4 | 25.2 | 15.9 | | | 15.9 | 4.8 | | 1.5654 | 60.3 |
| 56 | 38.0 | 19.3 | 5.4 | 62.7 | 60.6 | 30.8 | 8.6 | 36.9 | | | 36.9 | | 0.4 | 1.6152 | 59.7 |
| 57 | 38.0 | 19.3 | 5.4 | 62.7 | 60.6 | 30.8 | 8.6 | 35.8 | | | 35.8 | | 1.5 | 1.6208 | 59.7 |
| 58 | 38.0 | 19.3 | 5.4 | 62.7 | 60.6 | 30.8 | 8.6 | 34.9 | | | 34.9 | | 2.4 | 1.6199 | 62.6 |
| 59 | 36.0 | 19.3 | 5.4 | 60.7 | 59.3 | 31.8 | 8.9 | 34.9 | 2.0 | | 36.9 | 2.4 | | 1.6219 | 59.2 |
| 60 | 34.0 | 19.3 | 7.4 | 60.7 | 56.0 | 31.8 | 12.2 | 34.9 | 2.0 | | 36.9 | 2.4 | | 1.6219 | 59.9 |
| 61 | 42.0 | 19.3 | 5.0 | 66.3 | 63.3 | 29.2 | 7.5 | 28.9 | | | 28.9 | 4.8 | | 1.6096 | 60.6 |
| 62 | 35.0 | 19.3 | 5.0 | 59.3 | 59.0 | 32.6 | 8.4 | 35.9 | | | 35.9 | 4.8 | | 1.6263 | 58.8 |
| 63 | 36.4 | 19.3 | 7.4 | 63.1 | 57.7 | 30.6 | 11.7 | 34.9 | 2.0 | | 36.9 | | | 1.6162 | 59.7 |
| 64 | 34.0 | 19.3 | 7.4 | 60.7 | 56.0 | 31.8 | 12.2 | 34.9 | 4.4 | | 39.3 | | | 1.6194 | 59.1 |
| 65 | 38.0 | 19.3 | 5.4 | 62.7 | 60.6 | 30.8 | 8.6 | 34.9 | | | 34.9 | 2.4 | | 1.6178 | 60.2 |
| 66 | 40.0 | 17.3 | 5.4 | 62.7 | 63.8 | 27.6 | 8.6 | 34.9 | | | 34.9 | 2.4 | | 1.6173 | 60.0 |
| 9 | 39.0 | 13.2 | 7.8 | 60.0 | 65.0 | 22.0 | 13.0 | 20.0 | 4.0 | 3.0 | 27.0 | 15.0 | | 1.6384 | 56.4 |
| 10 | 35.7 | 21.0 | 5.8 | 62.5 | 57.1 | 33.6 | 9.3 | 36.0 | | | 36.0 | 1.0 | 0.5 | 1.6228 | 60.1 |

Table 4 indicates examples for the melting of further optical crown glasses which are intended to demonstrate that practically the entire range of the so-called heavy crown glasses may be attained with starting mixtures in accordance with the present invention.

TABLE 4.—IN PERCENT OF WEIGHT PER 100%

| Melt No. | $B_2O_3$ | $SiO_2$ | $Al_2O_3$ | Σ1 | $B_2O_3$ | $SiO_2$ | $Al_2O_3$ | CaO | SrO | BaO | Σ2 | $La_2O_3$ | $ZrO_2$ | $Li_2O$ | $Na_2O$ | $n_e$ | $v_e$ |
|---|---|---|---|---|---|---|---|---|---|---|---|---|---|---|---|---|---|
| 42 | 61.3 | | 22.5 | 83.8 | 73.2 | | 26.8 | 9.1 | | | 9.1 | | | 2.9 | 4.8 | 1.5392 | 60.5 |
| 43 | 56.2 | | 20.6 | 76.8 | 73.2 | | 26.8 | 16.7 | | | 16.7 | | | 2.7 | 3.8 | 1.5651 | 60.4 |
| 44 | 51.8 | | 19.1 | 70.9 | 73.2 | | 26.8 | 23.1 | | | 23.1 | | | 2.5 | 3.5 | 1.5874 | 60.2 |
| 45 | 48.1 | | 17.7 | 65.8 | 73.2 | | 26.8 | 28.6 | | | 28.6 | | | 2.3 | 3.3 | 1.5970 | 59.2 |
| 12 | 51.8 | | 19.1 | 70.9 | 73.2 | | 26.8 | 23.1 | | | 23.1 | 6.0 | | | | 1.5967 | 59.5 |
| 13 | 48.8 | | 19.1 | 67.9 | 71.9 | | 28.1 | 23.1 | | | 23.1 | 9.0 | | | | 1.6059 | 59.0 |
| 14 | 51.8 | | 19.1 | 70.9 | 73.2 | | 26.8 | 20.1 | | | 20.1 | 9.0 | | | | 1.5948 | 59.6 |
| 15 | 51.8 | | 16.1 | 67.9 | 76.3 | | 23.7 | 23.1 | | | 23.1 | 9.0 | | | | 1.6051 | 59.6 |
| 16 | 48.8 | | 19.1 | 67.9 | 71.9 | | 28.1 | 20.1 | | | 20.1 | 12.0 | | | | 1.6077 | 58.9 |
| 17 | 45.8 | | 19.1 | 64.9 | 70.1 | | 29.9 | 20.1 | | | 20.1 | 15.0 | | | | 1.6165 | 58.0 |
| 19 | 45.8 | | 16.1 | 61.9 | 74.0 | | 26.0 | 20.1 | | 3.0 | 23.1 | 15.0 | | | | 1.6219 | 57.9 |
| 20 | 45.8 | | 13.1 | 58.9 | 77.7 | | 22.3 | 20.1 | | 6.0 | 26.1 | 15.0 | | | | 1.6297 | 58.0 |
| 21 | 45.8 | 5.0 | 19.1 | 69.9 | 65.5 | 7.2 | 27.3 | 15.1 | 5.0 | | 20.1 | 15.0 | | | | 1.6123 | 58.5 |
| 22 | 45.8 | 10.0 | 19.1 | 74.9 | 61.1 | 13.4 | 25.5 | 10.1 | 10.0 | | 20.1 | 15.0 | | | | 1.6066 | 58.6 |
| 23 | 45.8 | | 16.1 | 61.9 | 74.0 | | 26.0 | 20.1 | | | 20.1 | 15.0 | 3.0 | | | 1.6279 | 57.1 |
| 24 | 45.8 | | 13.1 | 58.9 | 77.7 | | 22.3 | 20.1 | | | 20.1 | 15.0 | 6.0 | | | 1.6413 | 55.8 |

The attached drawing illustrates the three-component diagram of boric acid, silicic acid and aluminum oxide and locates a number of the examples of the tables thereon. The examples in the tables are identified by their melt numbers.

Obviously, many modifications and variations of the invention as hereinbefore set forth may be made without departing from the essence and scope thereof, and only such limitations should be applied as are indicated.

The invention claimed is:

1. Optical crown glass melted from a mixture essentially consisting of

|  | Weight, percent |
|---|---|
| $B_2O_3$ | 42–46 |
| $SiO_2$ | 0–3 |
| $Al_2O_3$ | 9–16.5 | the total concentration of these oxides in the mixture being from 55 to 62 wt. percent,

|  | Weight, percent |
|---|---|
| CaO | 20–25 |
| BaO | 0–3 |
| ZnO and/or CdO | 0–10 | the total concentration of these oxides in the mixture being from 23 to 35 wt. percent, and

|  | Weight, percent |
|---|---|
| $La_2O_3$ | 14–16 |
| $ZrO_2$ | 0–10 |
| $Ta_2O_5$ | 0–5 |

2. Optical crown glass melted from a mixture essentially consisting of

|  | Weight, percent |
|---|---|
| $B_2O_3$ | 34–44 |
| $SiO_2$ | 13–21 |
| $Al_2O_3$ | 5–10 | the total concentration of these oxides in the mixture being from 55 to 75 wt. percent, and

|  | Weight, percent |
|---|---|
| CaO | 25–37 |
| BaO | 0–5 | the total concentration of these oxides in the mixture being from 25 to 40 wt. percent, and

|  | Weight, percent |
|---|---|
| $La_2O_3$ | 0–5 |
| $Li_2O$ | 0–3 |

3. Optical crown glass melted from a mixture essentially consisting of

|  | Weight, percent |
|---|---|
| $B_2O_3$ | 43.6 |
| $SiO_2$ | 3.0 |
| $Al_2O_3$ | 9.9 |
| CaO | 23.0 |
| BaO | 3.0 |
| CdO | 2.0 |
| $La_2O_3$ | 15.1 |
| $ZrO_2$ | 0.4 |

4. Optical crown glass melted from a mixture consisting essentially of

|  | Weight, percent |
|---|---|
| $B_2O_3$ | 35.7 |
| $SiO_2$ | 21.0 |
| $Al_2O_3$ | 5.8 |
| CaO | 26.0 |
| $La_2O_3$ | 1.0 |
| $Li_2O$ | 0.5 |

(References on following page)

References Cited

UNITED STATES PATENTS

| | | | |
|---|---|---|---|
| 2,466,510 | 4/1949 | Sun et al. | 106—47 |
| 2,996,392 | 8/1961 | Bromer et al. | 106—47 |
| 3,248,238 | 4/1966 | Faulstich | 106—54 |

FOREIGN PATENTS

| | | |
|---|---|---|
| 3,711,966 | 8/1962 | Japan. |
| 255,914 | 7/1948 | Switzerland. |
| 147,301 | 10/1962 | U.S.S.R. |

HELEN M. McCARTHY, Primary Examiner

U.S. Cl. X.R.

106—47